E. T. ABENDROTH.
STANCHION.
APPLICATION FILED FEB. 9, 1914.
1,223,922.
Patented Apr. 24, 1917.
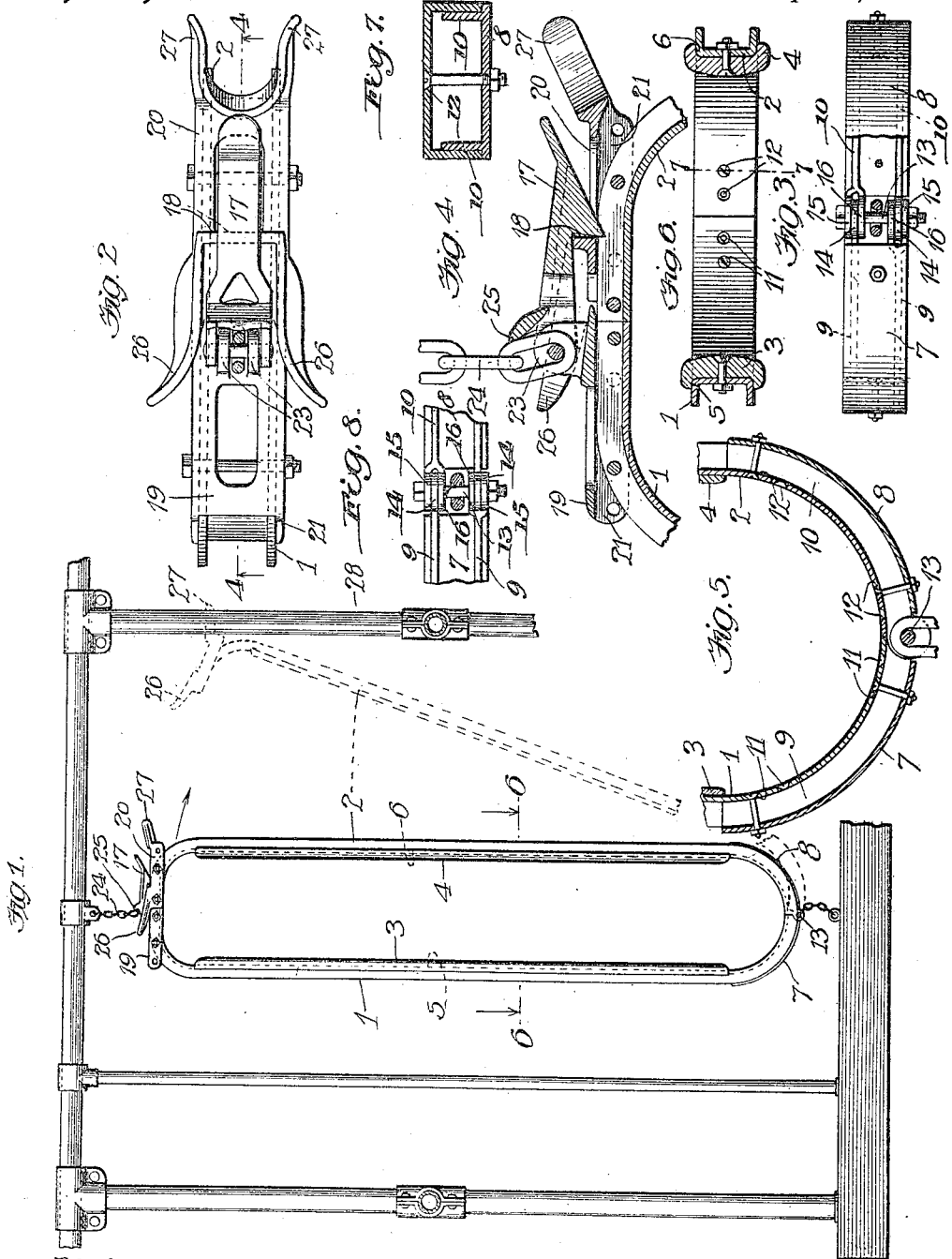
Witnesses
Martin H. Olsen.
A. H. Gauggoll.
Inventor
Elmer T. Abendroth
By G. W. E. Waldo,
Atty.

UNITED STATES PATENT OFFICE.

ELMER T. ABENDROTH, OF DE PERE, WISCONSIN, ASSIGNOR TO WESTERN STEEL & IRON WORKS, OF DE PERE, WISCONSIN, A CORPORATION OF WISCONSIN.

STANCHION.

1,223,922.  Specification of Letters Patent.  Patented Apr. 24, 1917.

Application filed February 9, 1914. Serial No. 817,471.

*To all whom it may concern:*

Be it known that I, ELMER T. ABENDROTH, a citizen of the United States, and a resident of De Pere, in the county of Brown and State of Wisconsin, have invented a certain new and useful Improvement in Stanchions, of which the following is a specification.

This invention relates to animal husbandry, class 119, and relates particularly to sub-class 147, stanchions.

The object of the invention is to provide a stanchion which shall combine the features of simplicity, strength, durability and relative cheapness of manufacture, and which may quickly and conveniently be adjusted to provide openings of different widths between the sides thereof to fit cattle of different sizes. To effect the foregoing objects, a stanchion of my invention comprises the various features, combination of features and details of construction hereinafter described and claimed.

In the accompanying drawing, in which my invention is fully illustrated,

Figure 1 is a front view of my improved stanchion, shown as applied in use in connection with a cattle stall.

Fig. 2 is a top plan view of my improved stanchion on an enlarged scale.

Fig. 3 is a bottom plan view thereof also on an enlarged scale.

Fig. 4 is a sectional view on the line 3—3 of Fig. 2, of the upper end of my improved stanchion.

Fig. 5 is a sectional view, also on the line 4—4 of Fig. 2 of the lower end of my improved stanchion.

Fig. 6 is an enlarged sectional view of the stanchion on the line 6—6 of Fig. 1.

Fig. 7 is an enlarged sectional view on the line 7—7 of Fig. 6; and

Fig. 8 is a fragmentary plan view of the inner sides of the connected ends of the hinge members, detached from the side bars.

Referring now to the drawing, the side bars of the stanchion consist of channel bars 1 and 2, the channels of which face outwardly, secured to the inner, flat surfaces of which, preferably by rivets, are wood strips or linings 3 and 4 designed to protect the necks of cattle from contact with the iron channels 1 and 2. In the preferable construction shown, the wood strips or linings 3 and 4 are provided, in the sides thereof designed to rest against the channel bars 1 and 2, with grooves 5 and 6 of substantially the same width as said channel bars and which are designed and adapted to receive said channel bars. The edges of said strips or linings 3 and 4 will thus overlap the edges of the channel members 1 and 2 of said side bars, thus connecting said strips or linings to said channel bars very rigidly and securely, and against possibility of accidental displacement.

The channel irons 1 and 2 are bowed or bent inwardly at both their upper and lower ends to provide a space of desired width between the side bars of said stanchion to receive the necks of the animals.

The channel bars 1 and 2 are connected at their lower ends by a hinge and at their upper ends by a catch, thus providing for opening or spreading the side bars apart to permit the head of an animal to be inserted through said stanchion so as to engage the animal's neck. Preferably, also, said hinge and catch are so constructed and arranged that the side bars of the stanchion may be adjusted relatively to each other to provide an opening between said side bars of greater or less width to accommodate cattle of different sizes.

In the preferable construction shown, the hinge for connecting the lower ends of the channel bars 1 and 2 consists of hinge members 7 and 8, which preferably consist of similar forgings or malleable castings, of substantially the same width as the channel bars 1 and 2 and which conform and are secured to the outer edges of the curved lower ends of the side flanges of the channel bars 1 and 2, the channels of which face outwardly as heretofore described. Formed on the inner surfaces of the hinge members 7 and 8 adjacent to the edges thereof are ribs or flanges 9 and 10 which are adapted to fit into the outwardly disposed channels of the channel bars 1 and 2. Said ribs or flanges 9 and 10 will aline the hinge members 7 and 8 with the channel bars 1 and 2 and will also prevent lateral displacement of said hinge members relatively to said channel bars. Said hinge members are adapted to be secured to the channel bars by means of bolts or the like, which are interchangeable in series of holes or openings 11 and 12 which are located at different distances from the ends of the channel bars 1 and 2, so that by inserting the connecting bolts through one set or the other of said holes, the lower ends of the side bars of said stanchion may be spread apart a greater or less distance, the usual range of adjustment being from 1½ to 2 inches.

In order that the contacting surfaces of the side bars 1 and 2 of the hinge members 7 and 8 shall conform to each other in different adjusted positions of said hinge members, said contacting surfaces form arcs of circles of substantially the same radius. Structurally, however, this relation, though preferable, is not essential, and is mainly desirable for the reason that exact conformity between the contacting surfaces of said hinge members and side bars presents a better appearance than if said contacting surfaces do not conform. Moreover, assuming that said contacting surfaces do conform substantially in any particular adjusted position, in view of the slight adjustment contemplated, any departure from conformity of said contacting surfaces, when in any other adjusted position, will be practically unnoticeable.

The hinge proper is formed by a bolt 13 inserted through holes formed in lugs on the adjacent ends of the hinge members 7 and 8, comprising a single lug 14 on each of said hinge members which form alined extensions of flanges 9 and 10 at opposite sides of said hinge members, respectively, when connected, and spaced lugs 15 and 16 which form off-set extensions of the flanges 9 and 10 on said hinge members other than the flanges of which the lugs 14 are extensions, between which the lugs 14 are adapted to fit. That is, as regards the arrangement of the hinge lugs, said hinge members when articulated in the manner contemplated, are symmetrical on opposite sides of their longitudinal centers.

All of said lugs are off-set with reference to the longitudinal centers of the hinge members 7 and 8, the relation being such that when said hinge members are connected by the bolt 13, a space will be formed between the innermost lugs 16 of sufficient width to permit the engagement therethrough of a supporting chain for said stanchion with the hinge bolt 13.

The upper ends of the side bars are adapted to be secured together in closed position by means of a catch 17 pivoted to one of the channel bars, which is adapted to engage a shoulder 18 formed on the other channel bar. As shown, said catch is pivoted on the channel bar 1 and said shoulder is formed on the channel bar 2.

To render the side bars of the stanchions adjustable with reference to each other, in order to vary the width of the space between said side bars so as to accommodate cattle of different sizes, said catch 17 and shoulder 18 are respectively pivoted to and formed on blocks or plates 19 and 20 adjustably secured to the upper ends of the channel irons 1 and 2 respectively. As shown, said plates or blocks are made in the form of channels, being provided with lateral flanges 21 which are adapted to receive and embrace the sides of the channel bars 1 and 2 and which are adapted to be secured to said channel bars by means of bolts inserted through holes formed in said channel blocks 19 and 20 and in the channel bars 1 and 2. As shown, the bolt holes in the channel bars 1 and 2 are formed directly in the lateral flanges thereof. As shown, also, said securing bolts are interchangeable in holes formed in the lateral flanges of the channel blocks 19 and 20 and which form series arranged lengthwise of said blocks, so that by inserting said securing bolts through one set or another of said holes, the distances between the upper ends of said channel bars 1 and 2 may be varied as desired within the limits of adjustment provided.

As shown, the catch 17 is pivoted to spaced lugs 23 formed on the channel block 19, the rear end of said catch being bifurcated and embracing the outer side of said lugs.

Connected to the pivot pin of the catch 17 between the bearing lugs 23 is a chain 24 by means of which said stanchion is supported in use, which is adapted to bear against a rigid portion of the catch 17, as shown, a projection 25 on said catch, which is so positioned that, under the weight of the stanchion, it will impart an upper and rearward inclination to the portion of said chain below said projection 25 relative to the pivot of said catch 17, whereby the weight of said stanchion acting through said chain and projection will exert a component of force tending to throw the free end of the catch 17 downwardly and thus to effect engagement thereof with the shoulder 18 on the channel block 20.

Relative lateral movement of the upper ends of the side bars of the stanchion is limited by a fork 26 on the channel block 20 which is adapted to straddle the catch 17 at its rear or pivoted end, when the side bars of the stanchion are closed.

Also, when the side bar 2, to which the channel block 20 is secured, is turned pivotally to open the stanchion, its movement is adapted to be limited and said channel bar secured in position to form a stop to insure that the animal will insert its head between the side bars of the stanchion, by means of a fork 27 on the rear end of the channel blocks 20 which is adapted to embrace an upright rod 28 forming part of the stall, when said side bar 2 is turned pivotally outward.

I claim:—

1. A stanchion comprising side bars the upper and lower ends of which extend inwardly to space said bars apart, hinge members adjustably secured to the lower inward extensions of said side bars, and catch members adjustably secured to the upper inward extensions of said side bars, substantially as described.

2. A stanchion comprising channel side bars, the upper and lower ends of which extend inwardly to space said bars apart, separate hinge members adjustably secured in the channels of the inwardly extending lower ends of said side bars and separate catch members adjustably secured to the inwardly extending upper ends of said side bars, said catch members comprising depending flanges which embrace the sides of said side bars, whereby said side bars are adjustable toward and from each other and said hinge and catch members are supported against lateral displacement relative to said side bars, substantially as described.

3. A stanchion comprising side bars hinged together at their lower ends, a catch on the upper end of one of said side bars which is adapted to engage a shoulder on the other of said side bars for connecting the upper ends of said side bars, and suspension means for said stanchion applied to said catch and adapted to maintain the same yieldingly in locking position, substantially as described.

4. A stanchion comprising side bars hinged together at their lower ends, a catch pivoted to one of said side bars which is adapted to engage a shoulder on the other of said side bars, suspension means for said stanchion which coöperates with a rigid part of said catch in use to maintain said catch yieldingly in locking position, substantially as described.

5. A stanchion comprising side bars hinged together at their lower ends, a catch pivoted to one of said side bars which is adapted to engage a shoulder on the other of said side bars, flexible suspension means for said stanchion connected to the side bar to which said catch is pivoted and which engages a rigid part of said catch, the relation being such that in use the weight of said stanchion will maintain said catch yieldingly in locking position, substantially as described.

6. A stanchion comprising side bars hinged together at their lower ends, a catch pivoted to one of said side bars which is adapted to engage a shoulder on the other of said side bars, flexible suspension means for said stanchion connected to the pivot pin of said catch and which engages a rigid part of said catch, the relation being such that in use an upward and rearward inclination will be imparted to the section of said flexible connection below the rigid part of said catch engaged thereby with reference to the pivot of said catch, substantially as described.

In testimony that I claim the foregoing as my invention, I affix my signature in the presence of two subscribing witnesses this 26th day of January, 1914.

ELMER T. ABENDROTH.

Witnesses:
J. B. BOCKMAN,
G. A. SNAVELY.

Copies of this patent may be obtained for five cents each, by addressing the "Commissioner of Patents. Washington, D. C."